(12) United States Patent
Porter et al.

(10) Patent No.: US 7,368,054 B2
(45) Date of Patent: May 6, 2008

(54) APPARATUS TO SEPARATE OIL AND DEBRIS FROM AN AQUEOUS FLUID

(75) Inventors: Brian Porter, Addison, IL (US); Christopher Barmore, Chicago, IL (US); Martin Lucassen, Round Lake, IL (US)

(73) Assignee: Safety-Kleen Systems, Inc., Plano, TX (US)

( * ) Notice: Subject to any disclaimer, the term of this patent is extended or adjusted under 35 U.S.C. 154(b) by 458 days.

(21) Appl. No.: 11/100,899

(22) Filed: Apr. 7, 2005

(65) Prior Publication Data

US 2006/0226058 A1 Oct. 12, 2006

(51) Int. Cl.
   B01D 17/02 (2006.01)
(52) U.S. Cl. ............ 210/143; 210/258; 210/242.3; 210/261; 210/262; 210/167.01; 210/257.1
(58) Field of Classification Search ......... 210/258, 210/242.3, 923, 259, 261, 262, 172.1, 172.6, 210/167.01, 257.1, 776, 416.5, 143
See application file for complete search history.

(56) References Cited

U.S. PATENT DOCUMENTS

| | | | |
|---|---|---|---|
| 1,107,391 A | 8/1914 | Welch | |
| 4,132,645 A | 1/1979 | Bottomley et al. | |
| 4,610,785 A | 9/1986 | Russell | |
| 5,030,342 A | 7/1991 | Ortega | |
| 5,053,145 A | 10/1991 | Ellison et al. | |
| 5,143,605 A | 9/1992 | Masciarelli | |
| 5,445,730 A | 8/1995 | Pattee | |
| 5,730,872 A | 3/1998 | Rhodes | |
| 6,042,721 A | 3/2000 | Peters, Jr. et al. | |
| 6,110,383 A | 8/2000 | Coombs | |
| 6,146,530 A | 11/2000 | Vollmer | |
| 6,180,004 B1 | 1/2001 | Drewery | |
| 6,183,654 B1 | 2/2001 | Terrien et al. | |
| 6,238,577 B1 | 5/2001 | MacLaren | |
| 6,277,287 B1 | 8/2001 | Terrien et al. | |
| 6,322,694 B1 * | 11/2001 | Iliadis et al. ........... | 210/167.01 |
| 6,358,409 B1 | 3/2002 | Jacoby, Jr. et al. | |
| 6,391,198 B1 | 5/2002 | Porter et al. | |
| 6,485,652 B1 | 11/2002 | Le Poder et al. | |
| 6,488,841 B2 | 12/2002 | Glasgow | |
| 2002/0185426 A1 | 12/2002 | Bealer, Jr. | |
| 2003/0075515 A1 | 4/2003 | Maki | |
| 2003/0178377 A1 | 9/2003 | Larson | |

* cited by examiner

Primary Examiner—Terry K Cecil
(74) Attorney, Agent, or Firm—Vedder Price P.C.

(57) ABSTRACT

A separator to separate oil and debris from an aqueous fluid includes a container with a cover, the top portion of which includes a control panel access door. The separator draws an aqueous fluid with one or a plurality of skimmers that float on the aqueous fluid inside one or a plurality of corresponding reservoirs. When the separator is operating, the surface portion of the aqueous fluid is drawn into each corresponding skimmer hose and transferred to the separator by a pickup hose. The separator separates oil, debris and any sludge that may be in the aqueous fluid to provide a substantially filtered aqueous fluid. The substantially filtered aqueous fluid is then returned to the reservoirs through an exit hose.

32 Claims, 9 Drawing Sheets

APPARATUS TO SEPARATE OIL AND DEBRIS FROM AN AQUEOUS FLUID

FIELD OF THE DISCLOSURE

The present application relates to fluid separation and filtering devices, and more particularly, to an apparatus to separate oil and debris from an aqueous cleaning solution.

BACKGROUND

An aqueous cleaning solution is typically used in machine shops, automotive repair facilities, or other types of workshops or factories to clean and/or cool various equipment or parts. The aqueous cleaning solution washes away oil, sludge, and various types of debris, such as metal shavings, from the equipment or parts. The used aqueous fluid is then stored in barrels or drums for later disposal.

Various filtering devices are used to remove oil, sludge, and/or debris from the aqueous cleaning solution so that the aqueous cleaning solution can be recycled. These filtering devices typically use a pump to draw the aqueous fluid from a reservoir of the aqueous fluid through a skimmer that floats on the aqueous fluid; remove the oil, sludge, and/or debris at various filtering stages; and, return the clean aqueous fluid back to the reservoir. The oil is typically removed by pumping the aqueous fluid into a drum. The oil floats to the top of the aqueous fluid when in the drum. Accordingly, by drawing the aqueous fluid from a bottom portion of the drum, the oil remains in the drum. Another filtering stage may be typically used after the oil filtering stage to remove any sludge or debris from the aqueous fluid. A filter may be used that includes a mesh therein to trap debris and/or sludge. Continuing the filtering process will eventually recycle the aqueous fluid in the reservoir to provide substantially clean aqueous cleaning solution in the reservoir. When the drum fills mostly with oil, the drum can be emptied or replaced with another drum. The mesh inside the filter can also be removed for replacement or cleaning.

Several drawbacks to the above-described filtering device exist. These filtering devices include a number of parts that are connected together to provide the above-described operation. When the drum fills and should be replaced or emptied, several or a large number of parts may have to be disassembled from the filtering device to gain access to the drum to empty or replace the drum. After the drum is replaced or emptied, the parts must be reassembled before commencing the filtering operation. The above-described filtering devices typically draw aqueous fluid from one reservoir. Therefore, to clean the aqueous fluid in several reservoirs, either the reservoirs must be connected, or the aqueous fluid in each must be filtered separately with the filtering device. The separate filtering of the reservoir may entail either an operator physically moving the filtering device from reservoir to reservoir, or having long enough hoses that can reach all of the reservoirs. Furthermore, the above-described filtering devices are manually operated in that a user turns on a pump to run the filtering device and has to turn off the pump either when the drum fills with oil or when the filtering operation is finished or has to be stopped for any reason. Accordingly, an operator must be at least attending the filtering operation continuously or frequently.

Therefore, there exists a need in the art for filtering device that can simultaneously and/or selectively operate on several reservoirs, includes components that are connected together and arranged so as to provide easy access to the drum and the contents thereof, and includes a control system for automatic operation thereof.

SUMMARY

In accordance with one principal aspect of the present disclosure, a separator to separate oil and debris from an aqueous fluid includes a container with a lid having a lid inlet and a lid outlet, an inlet tube connected to the lid inlet and extending into the container, and an outlet tube connected to the lid outlet and extending into the container. The separator further includes a manifold assembly connectable to the container that includes a manifold having an intake portion connected to the lid inlet, an exhaust portion connected to the lid outlet, and a bridge portion connecting the intake portion to the exhaust portion. The manifold assembly further includes a filter connected to the manifold and including an inlet port and an outlet port, wherein the inlet port is in communication with the exhaust portion of the manifold. The manifold assembly further includes a pump connected to the manifold and including an entrance and an exit, wherein the pump entrance is in communication with the outlet port of the filter. The manifold assembly additionally includes a controller connected to the manifold and operatively coupled to the pump to control the operation of the pump. The separator further includes a skimmer coupled to a pickup hose at a first end, and a second end of the pickup hose coupled to the intake portion of the manifold.

In accordance with another principal aspect of the present disclosure, a separator to separate oil and debris from an aqueous fluid includes an air pump having an entrance, an exit and an air receiving port, wherein the air receiving port is connected to a source of pressurized air to operate the pump, and wherein the pump provides negative pressure. The separator also includes a controller operatively coupled to the pump, the controller including a logic having at least a timer to time the operation of the pump. The separator further includes at least one skimmer operatively coupled to the pump and configured to float on the aqueous fluid, wherein the skimmer is further configured to draw a surface portion of the aqueous fluid with the suction of the pump to provide a drawn aqueous fluid. The separator also includes a manifold including an intake portion, an exhaust portion and a bridge portion connecting the intake portion to the exhaust portion, wherein the manifold is operatively coupled to the pump, and wherein the intake portion is connected to the skimmer with a pickup hose to receive the drawn aqueous fluid from the skimmer with the suction of the pump. The separator additionally includes a container including a lid having an lid inlet and a lid outlet, wherein the lid inlet is connected to the intake portion of the manifold to receive the drawn aqueous fluid from the intake portion, wherein the container is configured to substantially filter out the oil from the drawn aqueous fluid to provide a first filtered aqueous fluid, and wherein the exhaust portion of the manifold is connected to the lid outlet to receive the first filtered aqueous fluid. Further, the separator includes a filter including an inlet port and an outlet port, wherein the filter is operatively coupled to the pump, wherein the inlet port is in communication with the exhaust portion of the manifold to receive the first filtered aqueous fluid with the suction of the pump, and wherein the filter is configured to substantially filter out the debris from the first filtered aqueous fluid to provide a second filtered aqueous fluid. The entrance of the pump is connected to the outlet port of the filter to draw the second filtered aqueous fluid, and the second filtered aqueous fluid is ejected from the exit of the pump.

In accordance with another principal aspect of the present disclosure, a separator to separate oil and debris from an aqueous fluid includes a container having a lid including a lid inlet and a lid outlet, a manifold having a intake portion connected to the lid inlet with a first releasable lock, an exhaust portion connected to the lid outlet with a second releasable lock, and a bridge portion connecting the intake portion to the exhaust portion. The separator further includes a filter connected to the manifold and including an inlet port and an outlet port, inlet port being coupled to the exhaust portion of the manifold. The separator also includes a pump connected to the manifold and having an entrance and an exit, the entrance of the pump being connected to the outlet port of the filter, and a controller operatively coupled to the pump, the controller including a logic operatively coupled to a control panel. The first releasable lock and the second releasable lock are operative between a locked position and a released position, wherein the manifold, the filter, the pump and the controller are connected to the lid when the first and second releasable locks are in the locked position, and wherein the manifold, the filter, the pump and the controller are removable from the lid when the first and second releasable locks are in the released position.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION

Figure 1:
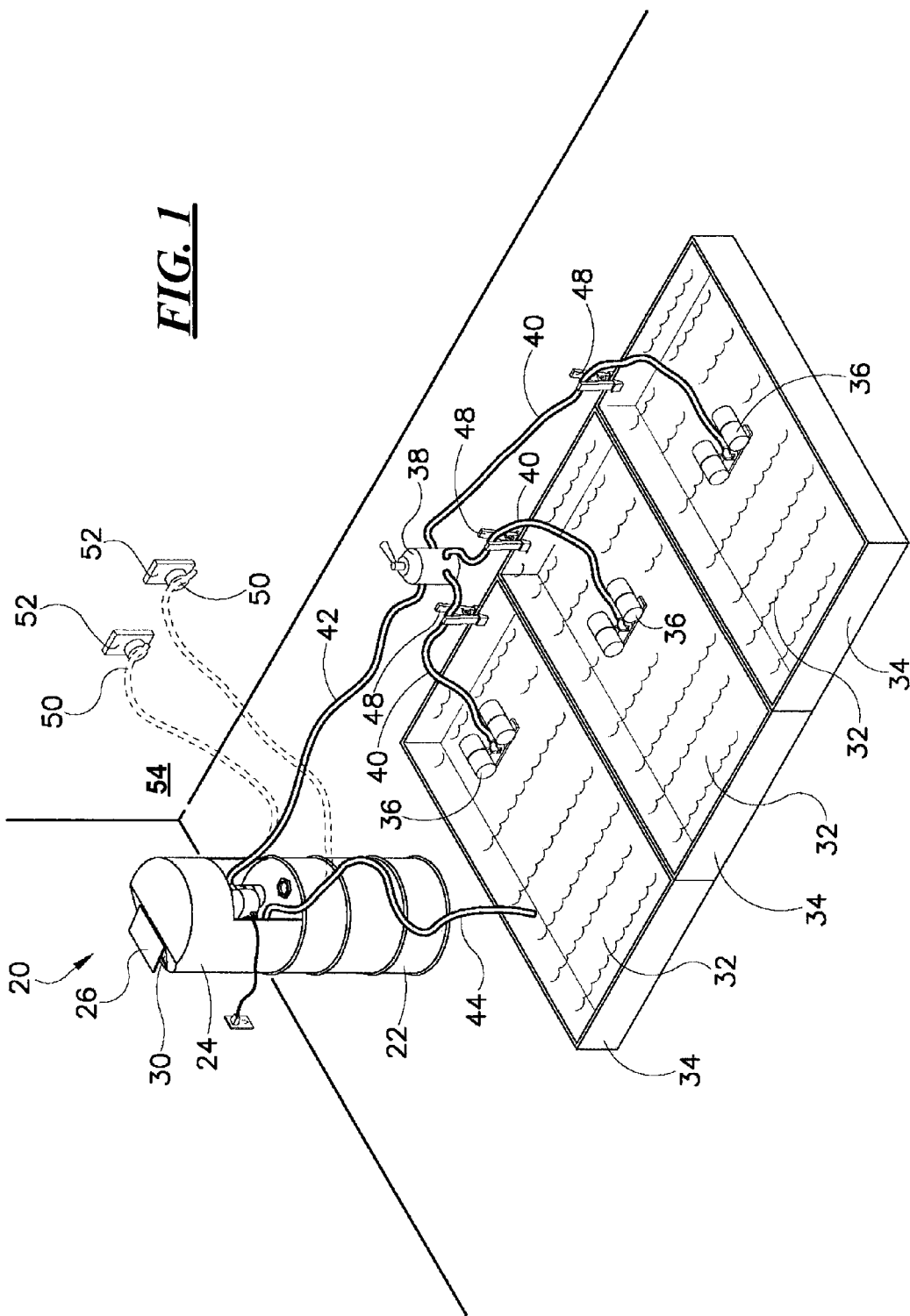
FIG. 1 illustrates a perspective view of a separator constructed in accordance with the teachings of the present disclosure.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

Referring to FIG. 1, a separator 20 to separate oil and debris from an aqueous cleaning solution constructed in accordance with the teachings of the present disclosure is shown. The separator 20 includes a container 22 that can have any shape desired. In the present disclosure, the container 22 is shaped like a typical oil barrel or drum, hence will be referred to herein as the drum 22. The separator 20 includes a cover 24 that has a similar shape as the drum 22. A top portion of the cover 24 includes a control panel access door 26 that is pivotally connected to the cover 24. By opening the control panel access door 26, an operator can access a controller 107 to control the operation of the separator 20. The separator 20 draws an aqueous cleaning solution 32 with one or a plurality of skimmers 36 that float on the aqueous fluid 32 inside one or a plurality of corresponding reservoirs 34. When the separator 20 is operating, the surface portion of the aqueous fluid 32 is drawn into each corresponding skimmer hose 40 and transferred to the separator 20 by a pickup hose 42. The separator 20 separates oil, debris and any sludge that may be in the aqueous fluid 32 to provide a substantially filtered aqueous fluid. The substantially filtered aqueous fluid is then returned to the reservoirs 34 through an exit hose 44.

The reservoir 34 may be a container or a sump that includes the aqueous cleaning solution, but may also include sludge components, such as grease washed from machine parts, metal shavings, filings or other residue from machining operations. The reservoir 34 may also include tramp oil, soapy and/or other aqueous residue from a parts washer, coolants from a machining center or the like. Accordingly, the aqueous cleaning solution, sludge and any debris that may be in the reservoir 34 is referred to herein as the used aqueous fluid 32.

Each skimmer 36 floats on top of the used aqueous fluid 32 inside a corresponding reservoir 34 and can draw a surface portion of the used aqueous fluid 32. Each skimmer 36 is connected to a selector valve 38 with a corresponding skimmer hose 40. The selector valve 38 is connected to a pickup hose 42. If only one skimmer 36 is used, the use of the selector valve 38 may not be necessary. An operator can select which of the skimmers 36 to use. Although only three reservoirs 34 are shown in FIG. 1, more reservoirs 34 may be present. Accordingly, additional skimmers 36 may be added to draw the used aqueous fluid 32 from the reservoirs 34 into the separator 20. Alternatively, the reservoirs 34 may be connected so that any overflow of the used aqueous fluid 32 from one reservoir 34 will flow into an adjacent reservoir 34. Accordingly, the number of skimmers 36 that are used may be less than the number of reservoirs 34. Although floating skimmers 36 are used in the disclosed separator 20, fixed skimmers (not shown) may also be used in each reservoir 34 to draw a surface portion of the used aqueous fluid 32.

Each skimmer hose 40 may be secured to a side wall of a corresponding reservoir 34 with a clamp 48. Accordingly, the portion of each skimmer hose 40 from the clamp 48 up to the skimmer 36 cannot be moved or disturbed by the movements of the remaining portion of the skimmer hose 40. Thus, the skimmer 36 will remain level with and floating on the used aqueous fluid 32. If the skimmer 36 is directly connected to the pickup hose 42, the pickup hose 42 can be secured to the side wall of the reservoir 34 with the clamp 48.

The end of the pickup hose 42 may include a releasable fastener 50. The end of the exit hose 44 also may include a releasable fastener 50. When the separator 20 is not in use, the releasable fasteners 50 can be attached to an object to maintain the pickup hose 42 and the exit hose 44 in an upright orientation. In the present disclosure, the releasable fastener 50 is a magnet 50. Accordingly, the magnet 50 can be attached to a metallic object in an upright orientation when the separator 20 is not operating or being serviced. The metallic objects may be a number of plates 52 that can be mounted on a wall 54 near the position of the separator 20 or to any one of the herein described components of the separator 20. The drum 22 may also be metallic. Accordingly, the magnets 50 can also be attached to the drum 22 so as to keep the exit hose 44 and the pickup hose 42 in an upright orientation. By keeping the pickup hose 42 and the exit hose 44 in an upright orientation when the separator 20 is not operational, any liquid that may be present in the exit hose 44 and the pickup hose 42 cannot spill out. Accordingly, the magnets 50 and the plates 52 provide a clean storage solution for the exit hose 44 and the pickup hose 42.

Figure 2:
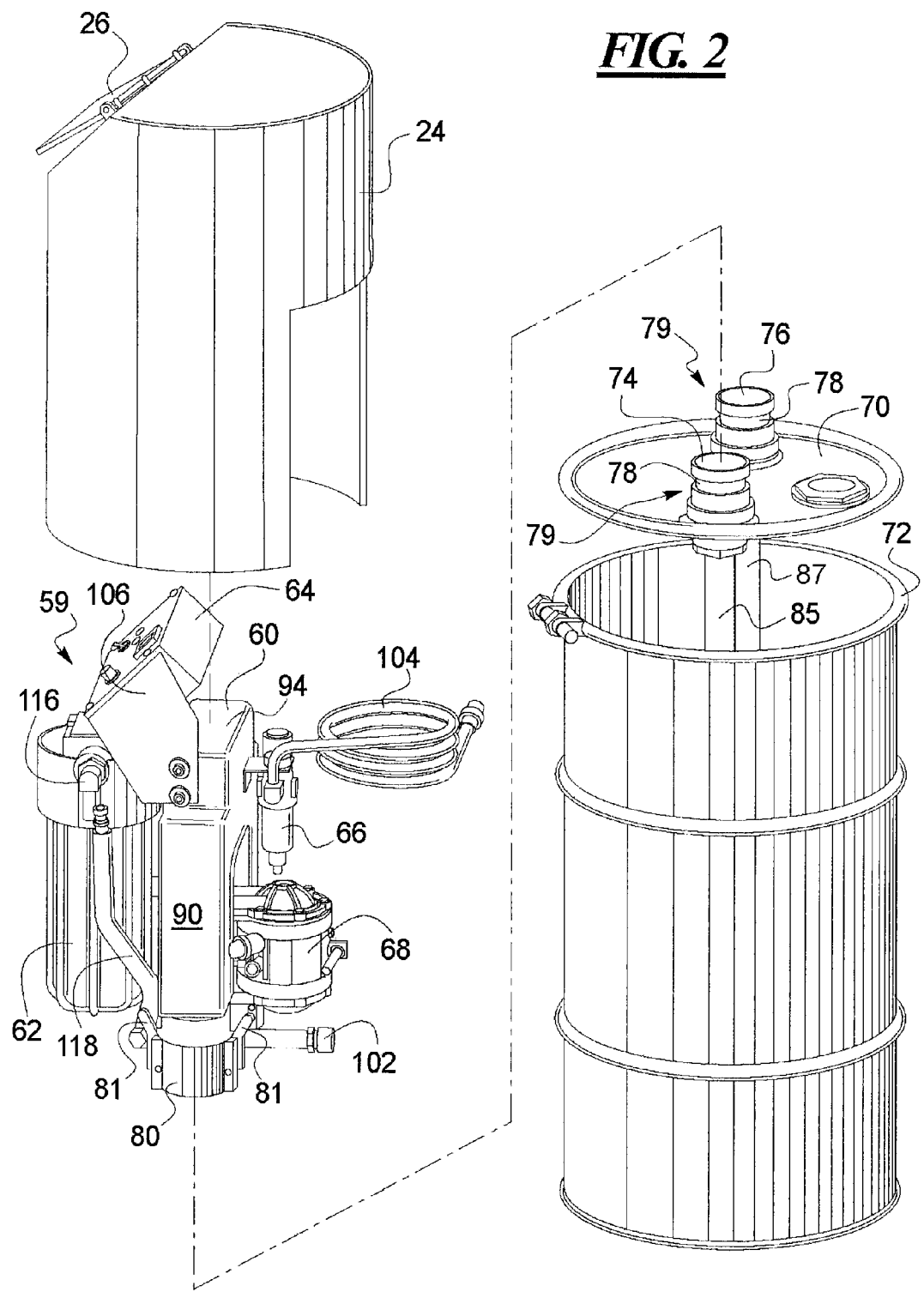
FIG. 2 illustrates an exploded view of a portion of a separator constructed in accordance with the teachings of the present disclosure.

Referring to FIG. 2, the separator 20 is shown in greater detail. The separator 20 includes a manifold assembly 59 that includes a manifold 60, a filter 62, a controller housing 64, a pressure regulator 66 and a pump 68, all of which are connected to the manifold 60. The cover 24 is sized to be placed over the manifold assembly 59 to cover the manifold assembly 59. The drum 22 includes a lid 70, which can be secured to the drum 22 with a clamp ring 72. The lid 70 includes a lid inlet 74 and a lid outlet 76. Each lid inlet 74 and lid outlet 76 includes an annular recess 78 to form a pair of clamp lock ports 79. The manifold 60 further includes a pair of cylindrical and hollow clamp locks 80 that engage the pair of clamp lock ports 79 of the lid 70 to securely connect the manifold assembly 60 to the lid 70. Each clamp lock port 79 may include a sealing member (not shown), such as an O-ring, washer, gasket, or the like, so as to seal the connection between the clamp locks 80 and the clamp lock ports 79. Each of the clamp locks 80 includes a pair of opposing inner tabs (not shown) that engage the annular recess 78 to securely connect the manifold assembly 59 to the lid 70. To unlock the claim locks 80 from the annular recesses 78 of the lid inlet 74 and the lid outlet 76, each tab of each clamp lock 80 includes an external handle 81 that can be pivoted by the operator to disengage the tabs from a corresponding annular recess 78. The handles 81 may be spring biased to the locked position. Accordingly, when the manifold assembly 59 is mounted on the lid 70, the clamp locks 80 may assist in engaging and locking to the lid inlet 74 and lid outlet 76.

The separator 20 includes an inlet tube 85 and an outlet tube 87 (partially shown in FIG. 2), both of which extend well into the drum 22 when the lid 70 is placed on the drum 22. When the used aqueous fluid 32 is pumped into the drum 22, the oil from the used aqueous fluid 32 will rise to the top. The drum 22 may include a layer of emulsified oil and aqueous cleaning solution under the layer of oil. Finally, the lowest layer in the drum 22 is layer of aqueous cleaning solution that may also include heavy debris. The inlet tube 85 extends well into the drum 22 so that the used aqueous fluid 32 is pumped into the aqueous cleaning solution layer. Accordingly, less foaming and emulsification results. The outlet tube 87 also extends well into the drum 22 so that only the aqueous cleaning solution layer including any debris that may be therein can be pumped out of the drum 22.

Figure 3:
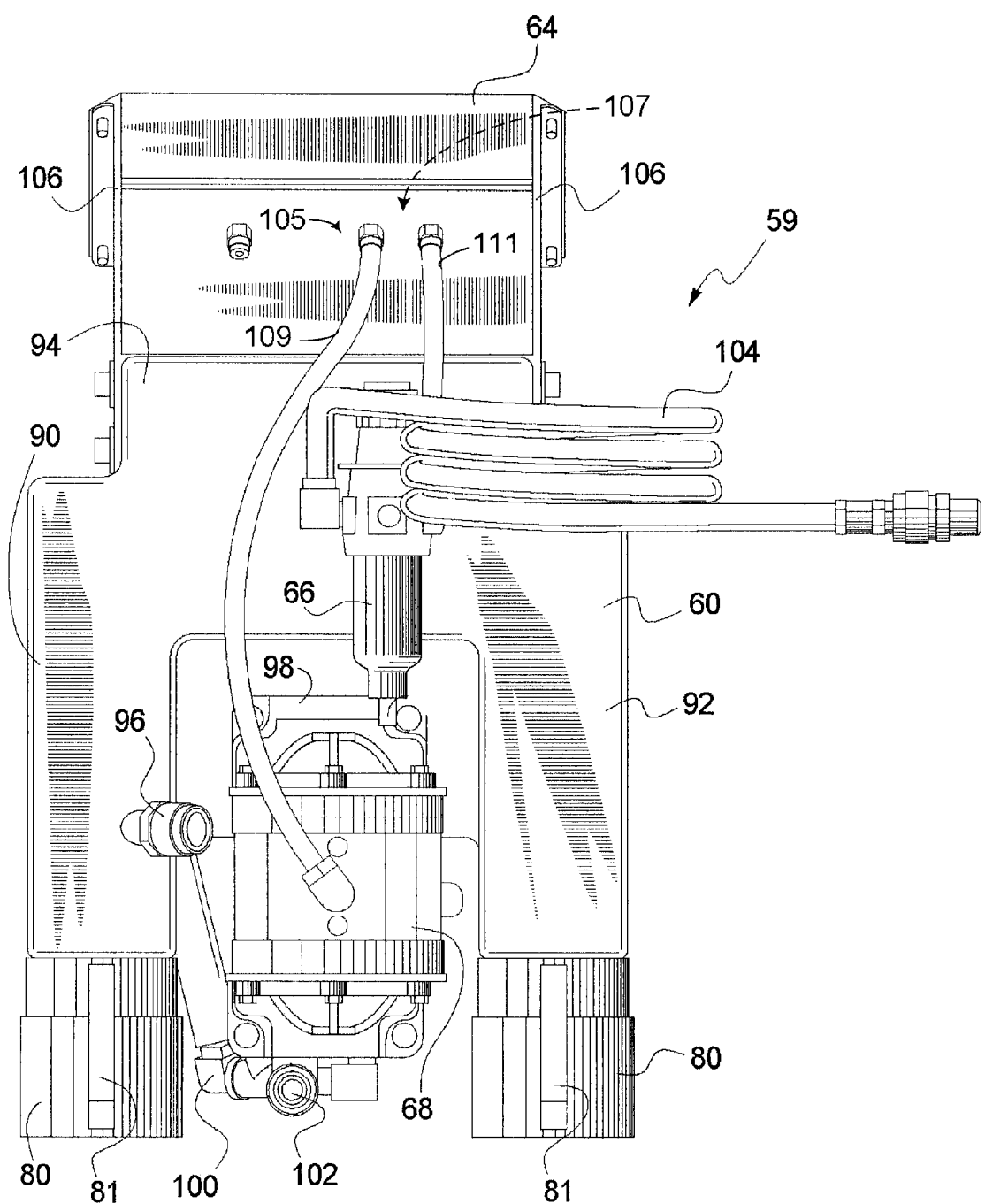
FIG. 3 illustrates a back view of a manifold assembly of a separator constructed in accordance with the teachings of the present disclosure.
Figure 4:
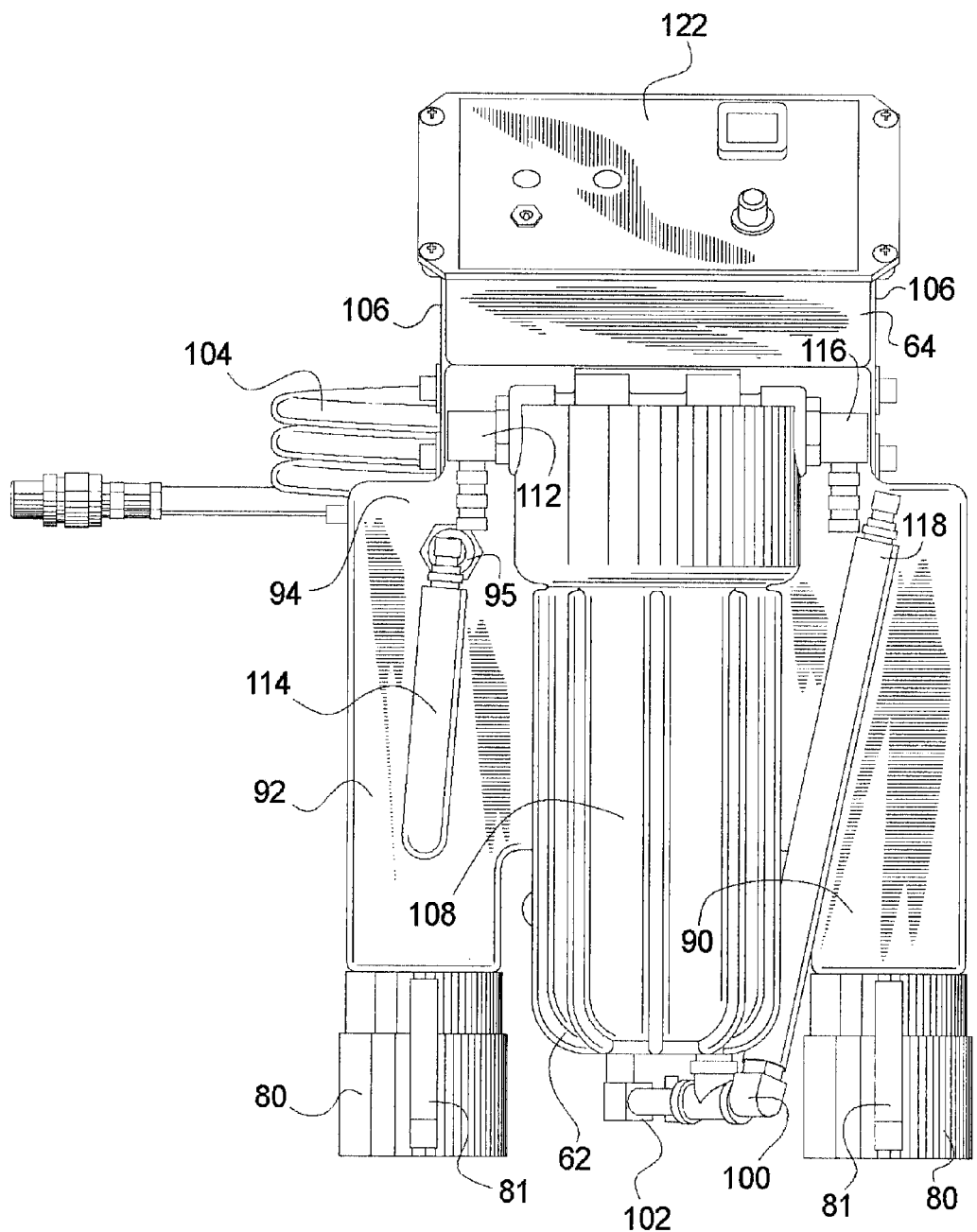
FIG. 4 illustrates a front view of a manifold assembly of a separator constructed in accordance with the teachings of the present disclosure.
Figure 5:
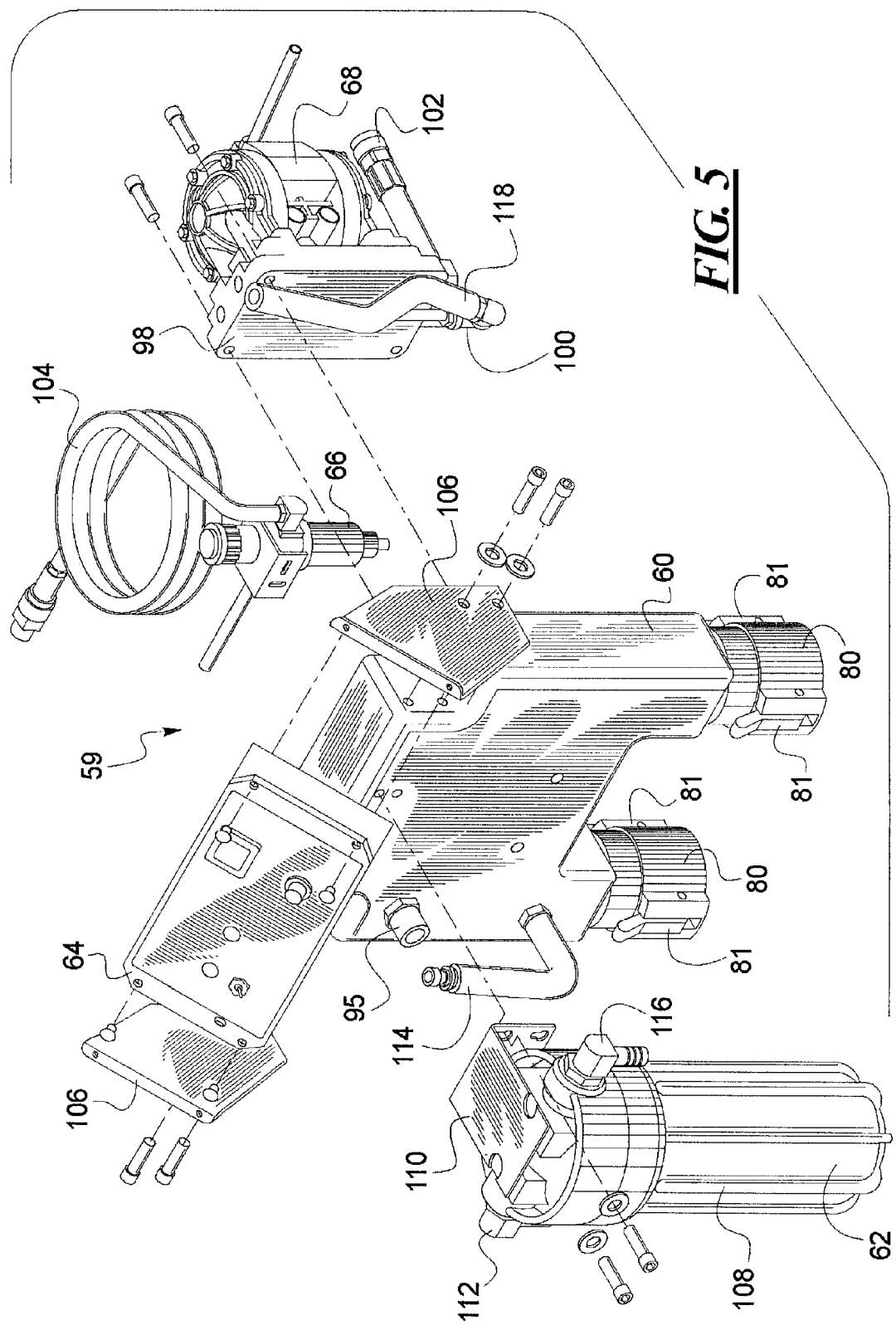
FIG. 5 illustrates an exploded view of a manifold assembly of a separator constructed in accordance with the teachings of the present disclosure.

Referring to FIGS. 3-5, manifold assembly 59 is shown in greater detail. Referring to FIGS. 3 and 5, the back of the manifold assembly 59 is shown. The manifold 60 includes an intake portion 90 and an exhaust portion 92 that are connected by a bridge portion 94. The intake portion 90 includes an intake port 96, to which the pickup hose 42 may be connected. The bridge portion 94 extends between the intake portion 90 and the exhaust portion 92 so as to equalize the suction or vacuum between these components and permits air to bypass the liquid phase without creating any additional emulsion. In addition, the manifold 60 includes a relief valve 95 (shown in FIGS. 4 and 5) to release the vacuum if necessary to prevent the collapse of the manifold 60 or other components of the system susceptible to such damage.

The air pump 68 is connected to the manifold 60 by a support plate 98, which may be a functional part of the pump 68. The pump 68 includes a pump entrance 100, from which fluids can enter and a pump exit 102 from which the fluids can be ejected. The pump 68 is air operated and is connected to a supply of pressurized air through an air hose 104. To regulate the pressure that is delivered to the pump 68 for the operation thereof, the pressure regulator 66 is connected to the pump 68 with a hose 105. The hose 105 may directly connect the pressure regulator 66 with the pump 68 (not shown). However, as shown in FIG. 3, the hose 105 may include a first section 111 that connects with the controller 107 and a second section 109 that connects the controller 107 with the pump 68. By having the hose 105 pass through the controller 107 with the hose sections 111 and 109, the operation of pump 68 can be controlled by the controller 107. The controller 107 can sense the vacuum level in the entire separator 20 by the hose sections 111 and 109.

The controller housing 64 is connected to the manifold 60 with a pair of opposing brackets 106. The controller housing 64 provides an enclosure for the controller 107 (shown in FIG. 10), the operation of which will be described in detail in the following. The controller housing 64 includes a control panel 122 which provides an operator with a user interface to control the operation of the separator 20.

Referring to FIGS. 4 and 5, the front of the manifold assembly 59 is shown in detail. The filter 62 includes a filter housing 108, in which a mesh or foam type filter (not shown) may be disposed. The filter 62 is connected to the manifold 60 with a bracket 110 (shown in FIG. 5). The filter 62 includes a filter inlet port 112 that is connected to the exhaust portion 92 of the manifold 60 with a connector hose 114. The filter 62 also includes a filter outlet port 116 that is connected to the pump entrance 100 with another connector hose 118.

Figure 6:
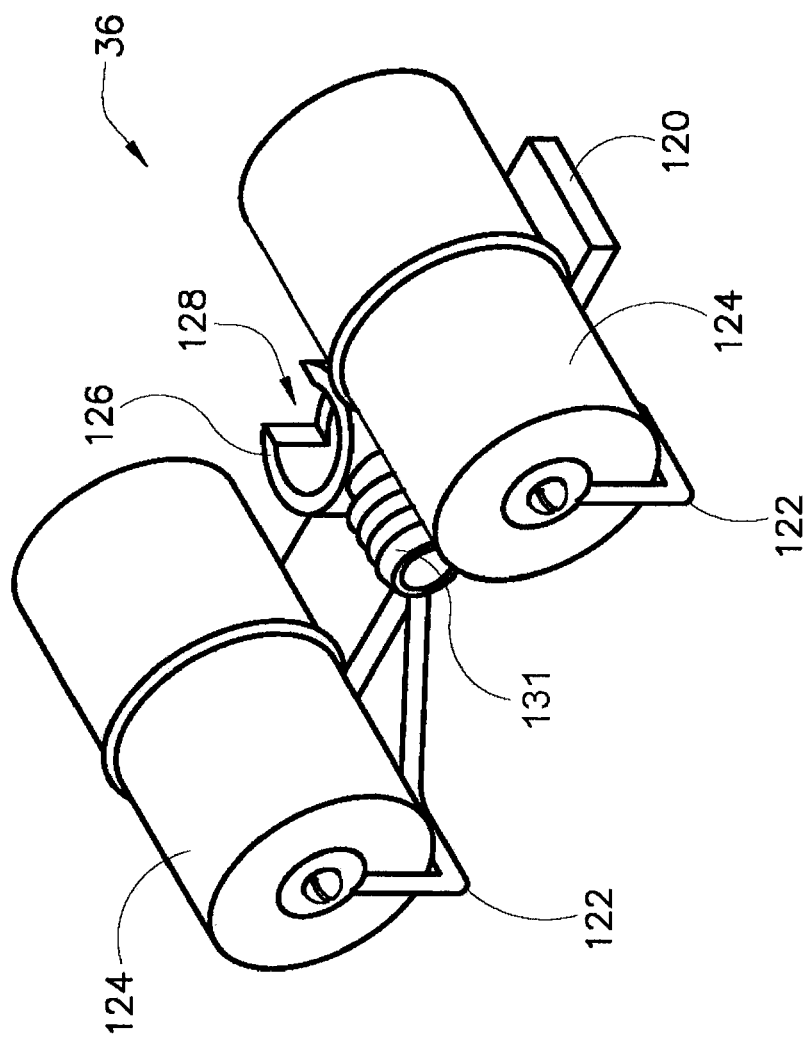
FIG. 6 illustrates a perspective view of a skimmer of a separator constructed in accordance with the teachings of the present disclosure.

Referring to FIG. 6, the skimmer 36 is shown in greater detail. The skimmer 36 includes a skimmer bracket 120 and a wire frame 122 that cooperatively support a pair of buoys 124 and a skimmer cup 126. The skimmer cup 126 includes a cup opening 128 and an integral or separate barb 131 that is connected to the cup opening 128. When the skimmer 36 is placed on the used aqueous fluid 32, the buoys 124 prevent the skimmer 36 from submerging in the used aqueous fluid 32. Additionally, the buoys 124 maintain the skimmer cup 126 near the surface portion of the aqueous fluid 32. Because the cup opening 128 remains partially at or below the surface portion of the used aqueous fluid 32, the surface portion of the used aqueous fluid 32 can be drawn into the skimmer cup 126 through the cup opening 128. From the skimmer cup 126, the surface portion of the used aqueous fluid 32 can then be drawn through the barb 131 to either the pickup hose 42 and/or the skimmer hose 40.

Figure 7:
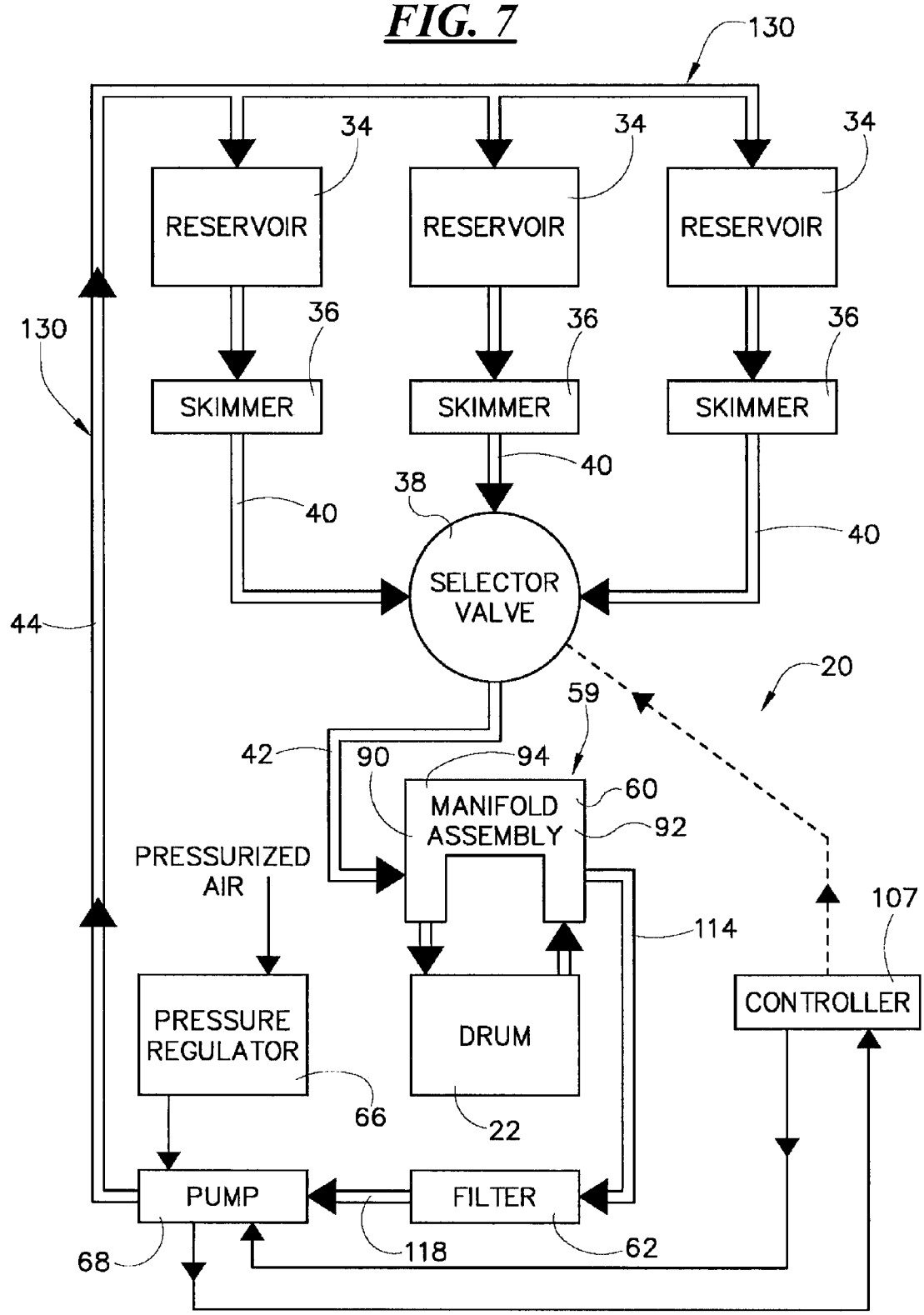
FIG. 7 illustrates a block diagram illustrating an operation of a separator constructed in accordance with the teachings of the present disclosure.

Referring to FIG. 7, a block diagram representing the operation of the separator 20 is shown. The separator 20 in combination with the reservoirs 34 define a flow circuit 130, wherein the used aqueous fluid 32 (not shown) is drawn from the reservoir 34, filtered to provide a substantially filtered aqueous fluid, and returned to the reservoirs 34. The pump 68 generates the suction that powers the flow circuit 130. To prevent air leaks and liquid leaks, all of the above-described components of the separator 20 and the connections of these components are substantially air and liquid sealed.

Each skimmer 36 can draw a surface portion of the used aqueous portion 32 from a corresponding reservoir 34. The manifold 60 receives the drawn aqueous fluid 32 at the intake portion 90 from the pickup hose 42. The drawn aqueous fluid 32 is then drawn from the intake portion 90 to the drum 22. Any oil that may be present in the aqueous fluid 32 floats toward the top of the drum 22. The drum 22 effectively separates the oil from the aqueous fluid 32 to provide a first filtered aqueous fluid. Accordingly, the bottom portion of the drum 22 contains the first filtered aqueous fluid, which may be a combination of aqueous cleaning solution and debris.

The suction of the pump 68 draws the first filtered aqueous fluid from the bottom portion of the drum 22 to the exhaust portion 92 of the manifold 60. From the exhaust portion 92, the first filtered aqueous fluid flows through the connecting hose 114 to the filter 62. The filter 62 may include a mesh or a form-filter component (not shown), through which the first filtered aqueous fluid is passed so that the debris in the first filtered aqueous fluid is trapped in the mesh or foam. Accordingly, the filter 62 provides a second filtered aqueous fluid by removing debris from the first filtered aqueous fluid. The second filtered aqueous fluid is also referred to herein as the substantially filtered aqueous fluid. The second filtered aqueous fluid is substantially composed of aqueous cleaning solution that is then drawn toward the pump 68 through the connecting hose 118. The pump 68 then ejects the second filtered aqueous fluid through the exit hose 44 back to the reservoirs 34. The operation of the flow circuit 130 continues in the above-described manner until the aqueous fluid 32 in the reservoir 34 is filtered and the reservoir 34 contains substantially the second filtered aqueous fluid, or the aqueous cleaning solution.

Figure 8:
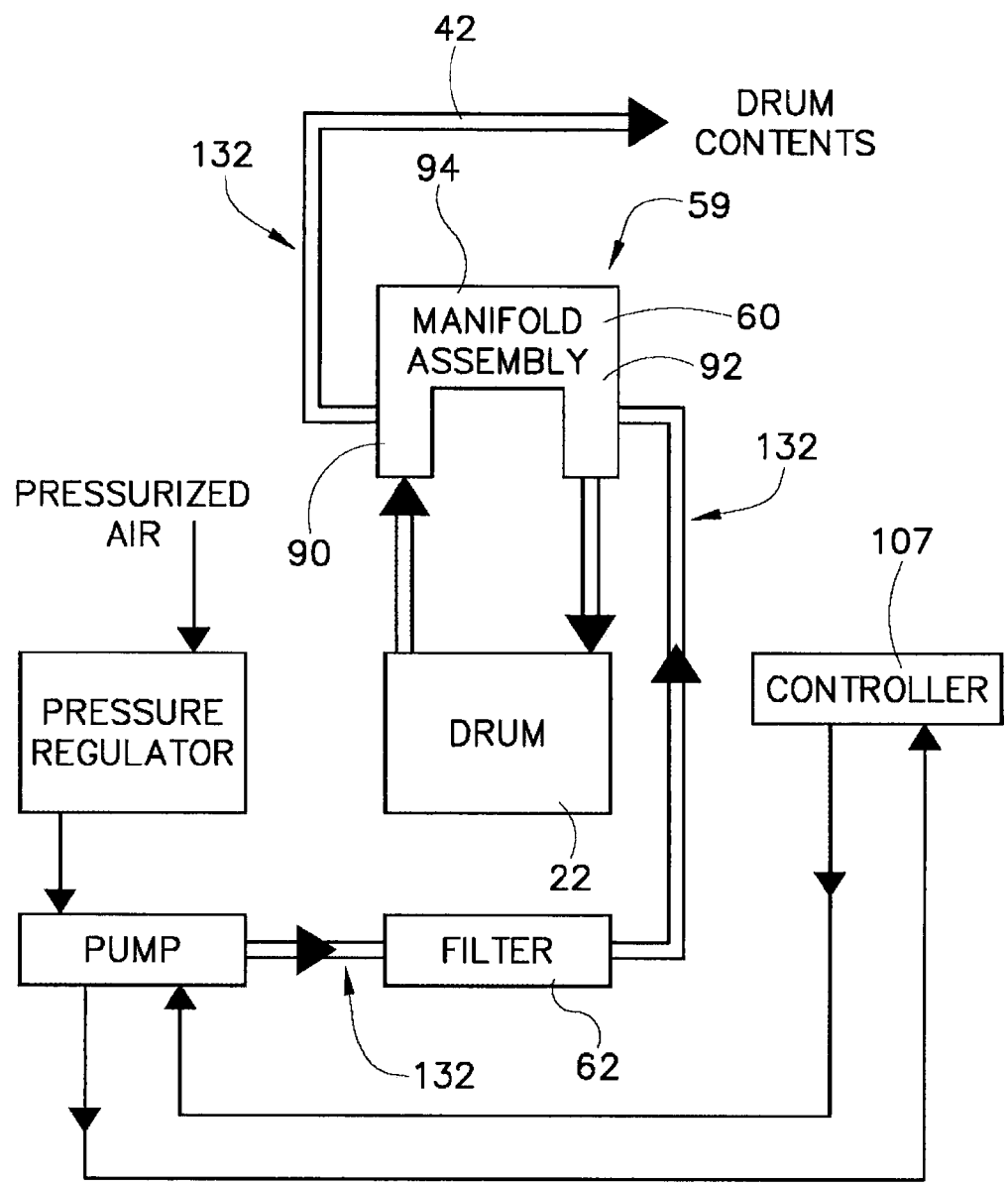
FIG. 8 illustrates a block diagram illustrating an operation of a separator constructed in accordance with the teachings of the present disclosure.

Referring to FIG. 8, the contents of the drum 22 can be emptied by reversing the pump 68. Initially, the exit hose 44 can be disconnected from the pump so that when the pump 68 is reversed, no fluid is drawn into the pump from the reservoir 34. Additionally, the pickup hose 42 is disconnected from the selector valve 38 and can operate as an exit hose. When the pump 68 is reversed, the direction of the flow circuit 130 is reversed to provide a reverse flow circuit 132. Accordingly, pressurized air is injected into the drum 22 through the exhaust portion 92 of the manifold 60. The air forces the drum's contents out of the drum 22 through the intake portion 90 of the manifold 60. The drum's contents are then pushed toward the pickup hose 42, from which they are rejected. Therefore, to empty the contents of the drum 22, the pump 68 can be reversed to eject the drum's contents 22 from the pickup hose 42.

Alternatively, to empty the drum 22, the drum 22 can either be removed from the separator 20 and emptied, or replaced with an empty drum 22. Referring to FIG. 2, to empty the drum 22, the manifold assembly 59 can be first removed from the lid 70. To remove the manifold assembly 59, the clamp locks 80 can be unlocked so as to be removed from the corresponding lid inlet 74 and lid outlet 76. Once unlocked, the manifold assembly 59 can simply be lifted and separated from the lid 70. The next step will be to remove the lid 70 from the drum 22. To that end, the clamp ring 72 can be unclamped to release the connection between the drum 22 and the lid 70. The lid 70 can then be removed from the drum 22.

Once the drum 22 is emptied or replaced, the lid 70 can be placed back on the drum 22 and the clamp ring 72 can be tightened to securely connect the lid 70 to the drum 22. The next step would be to mount the manifold assembly 59 back on the lid 70. Accordingly, the operator can simply lower the manifold assembly 59 over the lid inlet 74 and the lid outlet 76 so that the clamp locks 80 engage the corresponding claim lock ports 79. Therefore, once the manifold assembly 59 is connected to the lid 70, the cover 24 can be placed back on the manifold assembly 59, and the operator can commence or continue the operation of the separator 20.

Figure 9:
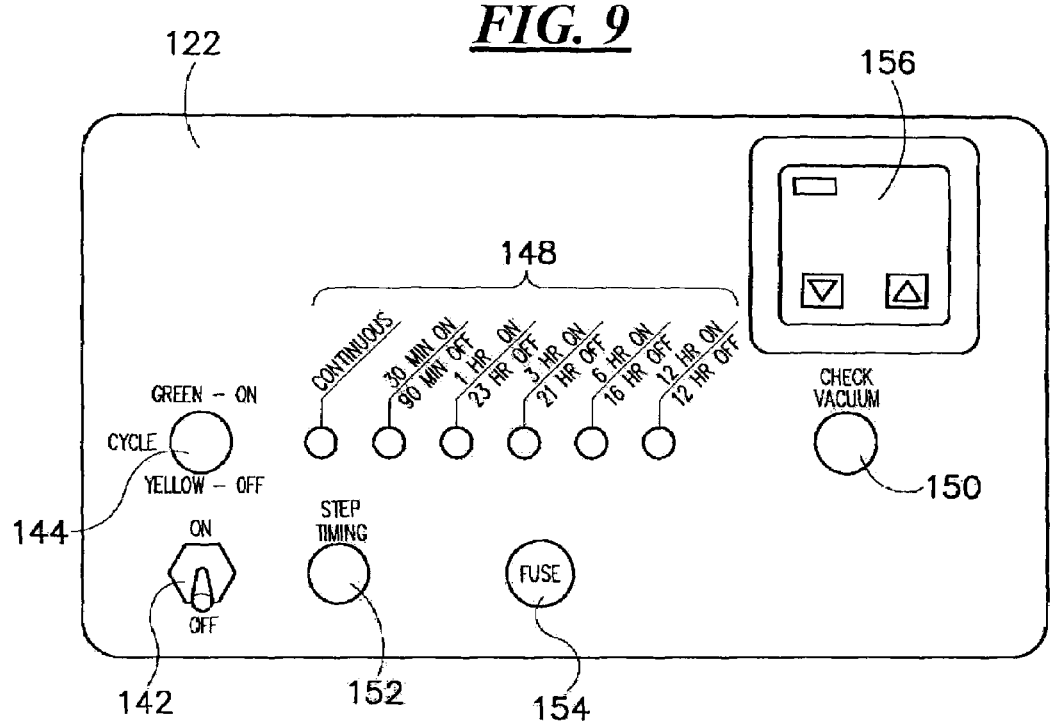
FIG. 9 illustrates a front view of a control panel of a separator constructed in accordance with the teachings of the present disclosure.

Referring to FIG. 9, the control panel 123 is shown in more detail. The control panel 123 is attached to the controller housing 64 (not shown in FIG. 9). The control panel 123 includes a power switch 142 that may be a rocker switch, by which an operator can turn the separator 20 on or off. Power status indicator 144 can display to a user whether the separator 20 is on or off. For example, in FIG. 9, the power status indicator is an LED (light emitting diode) that will display a green light when the separator 20 is on and a yellow light when the separator 20 is off. The control panel 123 also includes a number of timer LED's 148 by which the operator can select the timed operation of the separator 20. The control panel 123 includes a timer button 152, with which several operational modes of the separator 20 can be selected. Each operational mode corresponds with one of the timer LED's 148 to select an operational mode, the time rbutton 152 can be pressed until the corresponding LED 148 illuminates. In the disclosed examples, six timer LED's 148 are shown. The first timer LED 148, which is labeled as "continuous", operates the separator 20 on a continuous basis. The remaining timer LED's 148 provide a variety of on/off cycles of the separator 20. For example, the second timer LED 148 provides an operation cycle for the separator 20 that is thirty minutes on and ninety minutes off.

The control panel 122 also includes a LED panel 156 that continuously monitors the vacuum level. Additionally, the control panel 123 includes a warning indicator 150 in the form of an LED that prompts the operator to check the system because the vacuum level of the separator 20 may be too high or two low. The vacuum level represents the status of the operation of the pump 68, which may indicate a clogged filter, clogged skimmer, or air leak. Accordingly, when the drum 22 is nearly full, the check vacuum warning indicator 150 may illuminate to prompt the operator to empty the drum 22. The control panel 123 also provides access to a fuse (not shown) through a fuse port 154 on the control panel 123.

Figure 10:
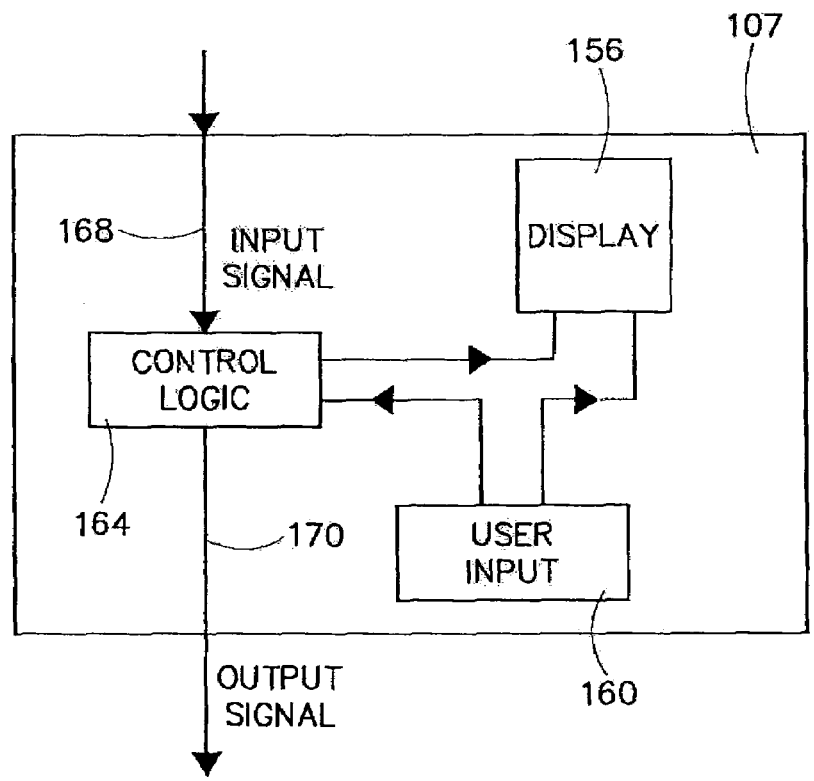
FIG. 10 illustrates a schematic diagram of a controller of a separator constructed in accordance with the teachings of the present disclosure.

Referring to FIG. 10, a block diagram of an exemplary controller 107 that may be used to control the operation of the separator 20 is shown. The controller 107 includes a user input 160 that is connected to the control panel 122. The controller 107 also includes the control logic 164 that may be an analog or a digital circuit. The control logic 164 may include various simple to complex control algorithms for the operation of the separator 20. However, the control logic 164 includes at least a timer to provide the above-described operational cycles of the separator 20. The controller 107 receives input signals from a controller input 168 and provides output signals from a controller output 170. The input signals may be from the pump 68, the pressure regulator 66, various sensors that may be placed in the drum 22 or the manifold 60, all of which may indicate various operational aspects of the separator 20. The output signal 170 may be control signals to control the pressure regulator 66, the pump 68 and optionally, the selector valve 38. Output signal 170, for example, may be able to turn the pump on or off, set the pressure setting of the pressure regulator 66, or adjust the selector valve 38 to select one or more skimmers 36 for the operation of the separator 20. For example, if the vacuum level rises beyond a preset level, which may indicate that the filter 62 or the drum 22 is nearly full, the controller 107 can turn off the pump 68 and provide a visual or audible warning to the operator to replace or empty the drum 22.

The separator 20 of the present disclosure provides several features that will make the operation thereof simple, efficient, and cost effective. As described above, the manifold assembly 59 can be easily secured and released from the lid 70 with the use of the clamp locks 80. Additionally, most of the components of the separator 20 are connected to the manifold 60. Accordingly, the drum 22 can be replaced or emptied without requiring an operator to disassemble a large number of parts. Additionally, the drum 22 can be simply emptied by reversing the pump 68. The controller 107 provides timed operation of the separator 20 in any number of desired cycles while monitoring the vacuum level of the separator 20. Accordingly, the operator may not have to continuously monitor the operation of the separator 20 and can attend to other work.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

What is claimed is:

1. A separator to separate oil and debris from an aqueous fluid, the separator comprising:
   a container including a lid having an lid inlet and a lid outlet;
   an inlet tube connected to the lid inlet and extending into the container;
   an outlet tube connected to the lid outlet and extending into the container;
   a manifold assembly removably positioned atop the container, the manifold assembly comprising:
      a manifold including an intake portion connected to the lid inlet, an exhaust portion connected to the lid outlet, and a bridge portion connecting the intake portion to the exhaust portion;
      a filter connected to the manifold and including an inlet port and an outlet port, wherein the inlet port is in communication with the exhaust portion of the manifold;
      a pump connected to the manifold and including an entrance and an exit, wherein the pump entrance is in communication with the outlet port of the filter; and
      a controller connected to the manifold and operatively coupled to the pump to control the operation of the pump; and
   a first skimmer coupled to a pickup hose at a first end, and a second end of the pickup hose coupled to the intake portion of the manifold.

2. The separator of claim 1, wherein fluid flow between the skimmer and the exit of the pump define a flow circuit, wherein the aqueous fluid is drawn into the flow circuit and a substantially separated solution is ejected from the flow circuit, wherein the pump is reversible to provide a reversible flow circuit to eject contents of the container from the intake portion of the manifold.

3. The separator of claim 1, the skimmer comprising a pair of spaced apart buoys connected to a bracket by a frame, and a skimmer cup connected to the bracket and disposed between the buoys, wherein the skimmer cup is connected to the first end of the pickup hose.

4. The separator of claim 1, further comprising:
   at least a second skimmer;
   a first skimmer tube connected the first skimmer and a second skimmer tube connected to the second skimmer;
   a selector valve connected to the first end of the pick up hose, the first skimmer tube and the second skimmer tube connected to the selector valve;
   wherein the selector valve is operable to connect the first skimmer tube to the pickup hose; and
   wherein the selector valve is operable to connect the second skimmer tube to the pickup hose.

5. The separator of claim 1, further comprising a cover configured to be mounted over the container to cover the manifold assembly, the filter, the controller and the pump, wherein the cover includes an opening disposed proximate to the controller to provide access to the controller from outside the cover.

6. The separator of claim 1, wherein the pump is an air operated pump, and wherein the separator further comprises an air hose connected to a source of pressurized air, and a pressure regulator connected to the manifold and connected to the air hose, wherein the pump is coupled to the source of pressurized air through the pressure regulator and the air hose for operation thereof.

7. The separator of claim 1, wherein the intake portion of the manifold is connected to lid inlet with an inlet cam lock mechanism, and wherein the exhaust portion of the manifold is connected to the outlet of the lid with an outlet cam lock mechanism.

8. The separator of claim 1, wherein the lid is removably connected to the container with a clamp ring.

9. The separator of claim 1, further comprising a pump exit hose connected to the exit of the pump, wherein any one of the pick up hose and the pump exit hose comprises a distal end having a releasable fastener for attachment of the distal end in an upright orientation to an object.

10. A separator to separate oil and debris from an aqueous fluid, the separator comprising:
   an air pump including an entrance, an exit and an air receiving port, wherein the air receiving port is connected to a source of pressurized air to operate the pump, and wherein the pump provides a suction;
   a controller operatively coupled to the pump, the controller including a logic having at least a timer to time the operation of the pump;
   at least one skimmer operatively coupled to the pump and configured to draw a surface portion of the aqueous fluid with the suction of the pump to provide a drawn aqueous fluid;
   a manifold including an intake portion, an exhaust portion and a bridge portion connecting the intake portion to the exhaust portion, wherein the manifold is operatively coupled to the pump, and wherein the intake portion is connected to the skimmer with a pickup hose to receive the drawn aqueous fluid from the skimmer with the suction of the pump;

a container including a lid having a lid inlet and a lid outlet, wherein the lid inlet is connected to the intake portion of the manifold to receive the drawn aqueous fluid from the intake portion, wherein the container is configured to substantially filter out the oil from the drawn aqueous fluid to provide a first filtered aqueous fluid, and wherein the exhaust portion of the manifold is connected to the lid outlet to receive the first filtered aqueous fluid;

a filter including an inlet port and an outlet port, wherein the filter is operatively coupled to the pump, wherein the inlet port is in communication with the exhaust portion of the manifold to receive the first filtered aqueous fluid with the suction of the pump, and wherein the filter is configured to substantially filter out the debris from the first filtered aqueous fluid to provide a second filtered aqueous fluid;

wherein the entrance of the pump is connected to the outlet port of the filter to draw the second filtered aqueous fluid, and wherein the second filtered aqueous fluid is ejected from the exit of the pump, wherein the filter, the manifold and the pump are positioned atop the lid and are removable together as an assembly.

11. The separator of claim 10, fluid flow between the skimmer and the exit of the pump defining a flow circuit, wherein the pump is reversible to provide a reversible flow circuit to eject contents of the container from the intake portion.

12. The separator of claim 10, the skimmer comprising a pair of spaced apart buoys connected to a bracket by a frame, and a skimmer cup connected to the bracket and disposed between the buoys, wherein the skimmer cup is connected to the pickup hose.

13. The separator of claim 10, further comprising:
at least a second skimmer configured to float on the aqueous fluid;
a selector valve configured to communicate with the at least one skimmer and the at least second skimmer;
wherein the selector valve is operable to connect the intake portion of the manifold to the at least one skimmer with the pickup hose; and
wherein the selector valve is operable to connect the intake portion of the manifold to the at least second skimmer with the pickup hose.

14. The separator of claim 10, further comprising a cover configured to be mounted over the container to cover the manifold, the filter, the controller and the pump, wherein the cover includes an opening disposed proximate to the controller to provide access to the controller from outside the cover.

15. The separator of claim 10, further comprising a pressure regulator connected between the air port of the pump and the source of pressurized air.

16. The separator of claim 10, wherein the intake portion of the manifold is connected to lid inlet with an inlet cam lock mechanism, and wherein the exhaust portion of the manifold is connected to the lid outlet with an outlet cam lock mechanism.

17. The separator of claim 10, wherein the lid is removably connected to the container with a clamp ring.

18. The separator of claim 10, further comprising a pump exit hose connected to the exit of the pump, wherein any one of the pick up hose and the pump exit hose comprises a distal end having a releasable fastener for attachment of the distal end in an upright orientation to an object.

19. A separator to separate oil and debris from an aqueous fluid, the separator comprising:
a container having a lid including a lid inlet and a lid outlet;
a manifold having an intake portion communicating with a skimmer and connected to the lid inlet with a first releasable lock, an exhaust portion connected to the lid outlet with a second releasable lock, and a bridge portion connecting the intake portion to the exhaust portion;
a filter connected to the manifold and including an inlet port and an outlet port, inlet port being coupled to the exhaust portion of the manifold;
a pump connected to the manifold and having an entrance and an exit, the entrance of the pump being connected to the outlet port of the filter;
a controller operatively coupled to the pump, the controller including a logic operatively coupled to a control panel;
wherein the first releasable lock and the second releasable lock are operative between a locked position and a released position, wherein the manifold, the filter, the pump and the controller are positioned atop and connected to the lid when the first and second releasable locks are in the locked position, and wherein the manifold, the filter, the pump and the controller are removable from the lid when the first and second releasable locks are in the released position.

20. The separator of claim 19, wherein the first releasable lock comprises a cam lock configured for mating engagement with the lid inlet, and wherein the second releasable lock comprises a cam lock configured for mating engagement with the lid outlet.

21. The separator of claim 19, the intake portion of the manifold and the exit of the pump defining a flow circuit, wherein the aqueous fluid is drawn into the flow circuit at the intake portion of the manifold and a substantially separated solution is ejected from the flow circuit at the exit of the pump, wherein the pump is reversible to provide a reversible flow circuit to eject contents of the container from the intake portion.

22. The separator of claim 19, wherein the logic comprises a timer.

23. The separator of claim 19, wherein the logic comprises a control system configured to control the pump.

24. The separator of claim 19, wherein the controller is connected to the manifold.

25. The separator of claim 24, further comprising a cover configured to be mounted over the container to cover the manifold, the filter, the controller and the pump, wherein the cover includes an opening disposed proximate to the controller to provide access to the controller from outside the cover.

26. The separator of claim 19, further comprising a skimmer including a pair of spaced apart buoys connected to a bracket by a frame, and a skimmer cup connected to the bracket and disposed between the buoys, wherein the skimmer cup is connected to a pickup hose.

27. The separator of claim 19, further comprising:
at least one selector valve connected to a pickup hose;
a plurality of skimmers, each skimmer being connected to the selector valve by a skimmer hose;
wherein each skimmer is selectively connectable to the pickup hose by the selector valve through the skimmer hose of the skimmer.

28. The separator of claim 27, wherein the selector valve is operatively coupled to the controller.

29. The separator of claim 27, wherein each skimmer comprises a pair of spaced apart buoys connected to a bracket by a frame and a skimmer cup connected to the bracket and disposed between the buoys.

30. The separator of claim 27, wherein the pump is an air operated pump, and wherein the separator further comprises an air hose connected to a source of pressurized air, and a pressure regulator connected to the manifold and connected to the air hose, wherein the pump is coupled to the source of pressurized air through the pressure regulator and the air hose for operation thereof.

31. The separator of claim 27, further comprising a pump exit hose connected to the exit of the pump, wherein any one of the pick up hose and the pump exit hose comprises a distal end having a releasable fastener for attachment of the distal end in an upright orientation to an object.

32. The separator of claim 27, wherein the lid is removably connected to the container with a clamp ring.

* * * * *